United States Patent Office 3,024,092
Patented Mar. 6, 1962

3,024,092
MODIFIED CARBON BLACK AND METHODS OF PREPARING AND USING SAME
Albert M. Gessler, Cranford, N.J., assignor to Esso Research and Engineering Company, a corporation of Delaware
No Drawing. Filed June 3, 1957, Ser. No. 663,002
18 Claims. (Cl. 23—209.2)

This invention relates to an improved process for modifying carbon blacks, as well as to the novel carbon black products resulting therefrom, and to the use of such novel products in various compositions, particularly in rubber compositions. The invention may be typified by the preparation of a new type of carbon black by severe ball-milling of a furnace or thermal black in the presence of air or oxygen, and the use of the resulting new and modified black in a vulcanized butyl rubber composition, having much superior properties, such as tensile strength, resiliency, abrasion resistance, etc., compared to corresponding compositions containing regular furnace or thermal blacks.

In the past there have been several attempts to make some improvements in certain types of carbon black by ball-milling under certain conditions. However, these earlier disclosures do not teach the present invention. For instance, U.S. Patent 2,066,274 teaches ball-milling a carbon black, presumably of the channel black type, at a temperature of 400 to 800° F. in a non-oxidizing atmosphere, such as carbon dioxide or nitrogen, to reduce its oil adsorption factor, e.g. from 220 to 175, without substantially lowering its tinctorial value. These conditions do not give satisfactory results for the purposes of the present invention. Another disclosure, an article in "Industrial and Engineering Chemistry," 1946, page 1145, shows that a structure black such as acetylene black can be somewhat altered by mechanical treatment such as ball-milling (with flint pebbles for 3 hours) and pelletizing. The effects were chiefly an increase in apparent density, some decrease in oil adsorption, a decrease in smoothness of uncured rubber compounds, and in cured rubber a loss in modulus, a slight decrease in pH from 7.4 to 5.7, and no change in tensile strength, as well as no substantial change in particle size. It was also noted then when an SRF black was subjected to mechanical compression (from 12.5 to 29.3 lb./cu. ft. density) no change in rubber properties occurred (e.g. modulus and tensile strength).

Thus, the prior art teaches that no essential benefit would be derived from ball-milling of carbon blacks, for rubber compounding purposes.

According to the present invention, quite to the contrary, it has been found that a severe attrition, such as heavy ball-milling for an extended time, preferably in the presence of air, and at room temperature or slightly elevated temperatures, does effect remarkable improvements in carbon black. Thus, modified carbon blacks are produced which have never heretofore been obtained by any process, and when these novel modified blacks are compounded with other materials, particularly in rubber compositions, and most especially those containing the synthetic rubber called butyl rubber, surprising and advantageous results are obtained.

Although the invention is intended to apply broadly to all types of carbon black, the greatest advantages are obtained with carbon blacks having a pH value above 6, such as particularly the furnace blacks generally ranging from about 7 to 10 in pH value, and the thermal blacks which usually are in the pH range of about 7 to 8. The invention is also especially applicable to carbon blacks having a high structure, as indicated by a structure value (oil adsorption) of at least 10 gal./100 lbs., especially those having a structure index above 100, e.g. acetylene black having a structure index of 300, and high modulus furnace black with a structure index of 160, and lamp black having a structure index of 200. High structure interferes with mobility of the carbon black particles during compounding with rubber.

By the present invention, modified carbon blacks are obtained which have low structure, good mobility during mixing, and a combination of high area and reactivity (as indicated by low pH).

The interrelationships of these various properties may be suitably expressed in a mathematical formula:

$$X = \frac{2,000 + 100A}{pH \times S}$$

in which X represents the over-all "activity value," A is "area" (in acres per pound), and S is "structure" (in gallons of oil absorbed per 100 pounds). Compared to prior art "X" values ranging from 13 up to 73, the present invention provides modified carbon blacks having X values above 75, and preferably at least 80, and ranging up to 170, or even 200 or more.

Channel blacks generally have substantially the highest X value of any carbon blacks heretofore available, e.g. in the range of 60–75, furnace blacks about 25–35, thermal blacks about 40–60, and acetylene blacks about 10–25. Even the color blacks, which have a relatively low pH in the range of 2.8 to 3.5, have X values in the range of 45 to 75. Thus, the carbon blacks made according to the present invention, and having X values above 75, particularly from 80–200, constitute an entirely new product per se.

Likewise, the novel carbon blacks of this invention, have been found to have a number of new and interesting properties. For instance, they have a higher peroxidic content than channel black, and this is especially remarkable since they generally have a pH value in the same range as that of channel black. These blacks are not pyrophoric if ball-milled in air, but are if they are ball-milled in nitrogen. When ball-milled in $N_2$, the fact that they are pyrophoric distinguishes them from blacks treated as in U.S. Patent 2,066,275.

When ball-milled in air, the blacks will burn if they are heated. This makes them different from standard blacks which do not burn under the same conditions.

It is also noteworthy that the novel carbon blacks of this invention are generally paramagnetic.

In carrying out the invention, the carbon black with or without optional drying or other preliminary treatment, is subjected to severe attrition, such as by heavy ball-milling, or rolling between tight steel rolls, jet impact attrition, etc., preferably in the presence of air or oxygen, or oxygen-enriched air, although these may not be absolutely essential. The temperature of the attrition operation should generally be from about 0 to 200° C., preferably from about 20 to 100° C. Although the mechanism of the physical and chemical changes which take place is not understood with certainty, it is believed that the beneficial results are due to a combination of at least two or three or more different factors, including a reduction in the structure value of the carbon black, a decrease in the pH value either due to or accompanied by an increase in the peroxidic value, and always an increase (25–200%) in surface area. In general, the ball-milling or other attrition should be carried out to such extent that the value of the X, in the above mentioned formula, should be raised from below 75 to preferably 80 or above, e.g. to the range of about 80 to 200, to some specific values such as 85, 100, 120, 130, 140, 170 and higher.

As the amount of attrition desired is very severe, it is exigent to use steel balls or some other suitably high density grinding media having a specific gravity of at least 7, instead of flint pebbles, and generally the balls should be large enough in diameter to give high impact force, i.e. high mass X velocity. Thus, in laboratory ball mills, one may use steel balls of ¼ to 1 inch. Commercially even larger sizes may be used such as up to 2 inches in diameter.

With smaller balls, one gets many more collisions and this partly makes up for difference in ball diameter. It is best to use the smallest size grinding media which can successfully give the desired 50% to 1000% increase in X value, from 10–75 up to the range of 80–200.

Also, the size of the ball mill, the weight of the charge of balls, and its ratio to the weight of carbon black, as well as the speed of rotation of the ball mills, should all be adjusted to give severe ball-milling attrition. The duration of the treatment may vary somewhat according to the various equipment factors mentioned above, as well as with the nature of the particular carbon black to be treated, but generally should be within the range of about one hour to 50 hours, preferably about 5 to 25 hours, for best practical results. The behavior of channel blacks is somewhat erratic, perhaps due to the fact that it already has a relatively low pH value, in the range of about 4 to 5, and appears to undergo more a change in the nature of the oxygen-containing groups on the carbon black surface rather than a substantial increase in the quantity thereof. They also undergo some reduction in structure, and, even though they have fine particle size they undergo a substantial increase in area.

Instead of using ball-milling to effect the desired attrition of the carbon black, other means may be used such as supersonic vibration using either the black alone or the black with an attrition media such as steel balls, or impingement of the black against a surface or target where the black particles are blown at very high velocity against the target. Other attrition processes using hammer action, such as in hammer mill grinding between steel rolls, such as the conventional rubber mill, which have been set very tight, e.g. to a clearance of 0.010 inch or less, or other grinding techniques and the like are also suitable.

These various attrition treatments can be carried out by batch operation, or by continuous process. Some of these novel ball-milled blacks have been stored under ordinary conditions for 1 year and little or no change was found either in the black itself or the butyl rubber compounds made from it.

When compounding with rubber, the proportions to be used will, of course, vary according to the intended use of the compositions, but generally should be in the range of about 10 to 150 (preferably about 20 to 100) parts by weight of carbon black per 100 parts of the rubber. For use in tires for autos, airplanes, etc., about 30 to 70 parts, e.g. 50 parts, of carbon black give satisfactory results. Generally 15 volumes more may be used to get equivalent effect.

These new carbon blacks not only have the special characteristics per se which were mentioned hereinabove, but they also impart new and surprising properties to compositions in which they are admixed with other materials. This is outstandingly true in compositions containing butyl rubber which is a synthetic high molecular weight rubbery copolymer of a major proportion of an isoolefin and a minor proportion of a multi-olefin. It may be made as described in U.S. Patent 2,356,128, and is preferably a copolymer containing about 0.5 up to 15% of combined conjugated diolefin of 4 to 6 carbon atoms, e.g. butadiene, isoprene, cyclopentadiene, etc., and the balance of an isoolefin of 4 to 6 carbon atoms, e.g. isobutylene, 2-$CH_3$ butene-1, etc., alone or with 0.1–0.8% or more of divinylbenzene, dimethallyl, etc., or with about 0.5 to 10% or so of styrene, p-$CH_3$ styrene, indene, etc., the copolymer preferably having a Staudinger molecular weight of at least 20,000 up to 300,000 or so, and an iodine number (Wijs) of about 0.5 to 50. On account of its relatively low unsaturation (compared to an iodine number of 350 for natural rubber, and about 250 to 400 for various other high unsaturation synthetic rubbers), it has been difficult in the past to make compositions of butyl rubber reinforced with carbon black having a desired combination of high tensile strength, high modulus, good elongation, together with good hysteresis and low internal viscosity. The novel carbon blacks of this invention make outstanding improvements in butyl rubber compositions, especially increased tensile strength, tensile product (product of tensile strength×elongation), extensibility, resilience and abrasion resistance, and reduced hardness or stiffness, and abrasion loss.

Still further unobvious results are obtained in compounding these new carbon blacks with halogen-containing butyl rubber compositions, such as made by chlorinating or brominating butyl rubber, preferably in a manner which does not substantially degrade the molecular weight thereof. More particularly, in producing halogenated butyl rubber, the halogenation is regulated so that the resulting rubber will contain at least about 0.5 weight percent (preferably at least about 1.0 weight percent) combined halogen but not more than about "X" weight percent combined chlorine or 3.0 "X" weight percent combined bromine wherein:

$$X=\frac{M_3 L}{(100-L)M_1+L(M_2+M_3)}\times 100$$

and $L$=mole percent of the multiolefin in the polymer
$M_1$=molecular weight of the isoolefin
$M_2$=molecular weight of the multiolefin
$M_3$=atomic weight of chlorine or bromine Suitable halogenating agents which may be employed are gaseous chlorine, liquid bromine, alkali metal hypochlorites or hypobromites, $C_4$ to $C_{10}$ tertiary alkyl hypochlorites, sulfur bromides, sulfuryl chloride, pyridinium chloride perchloride, N-bromosuccinimide, alpha-chloroaceto-acetanilide, N,N'-dichloro-5,5 dimethylhydantoin, iodine halides, trichlorophenol chloride, N-chloroacetamide, beta-bromo-methyl phthalimide, etc. The preferred halogenating agents are gaseous chlorine, liquid bromine, sulfuryl chloride, sulfuryl bromide, chlorohydantoins, bromo-hydantoins, iodine monochloride, and related materials.

The halogenation is generally conducted at temperatures of above about 0° to about +100° C., depending upon the particular halogenating agent, for about one minute to several hours. An advantageous pressure range is from about 0.1 to 1000 p.s.i.a., atmospheric pressure being satisfactory. The halogenation may be accomplished by preparing a 1 to 80 weight percent solution of such copolymers as above, in a substantially inert liquid organic solvent such as a $C_3$ to $C_{10}$ substantially inert hydrocarbon or halogenated derivatives of saturated hydrocarbons; e.g., hexane, mineral spirits, cyclohexane, benzene, chlorobenzene, chloroform, carbon tetrachloride, mixtures thereof, etc., and adding thereto the halogenating agent, which may optionally be in solution, such as dissolved in a substantially inert hydrocarbon, an alkyl chloride, carbon tetrachloride, carbon disulfide, etc. If chlorine gas is employed, it may also be diluted with up to about 50 times its volume, preferably about 0.1 to 5.0 times its volume, of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated copolymer and dried under about 1 to 760 millimeters or higher of mercury pressure absolute at about 0° to 180° C., preferably about 50° to 150° C. (e.g. 70° C.). Other methods of recovering the halogenated polymer are by conventional spray or drum drying techniques. Alternatively, the solution of the halogenated butyl rubber may be injected into a vessel containing steam and/or agitated water heated to a temperature sufficient to volatilize the solvent and form an aqueous slurry of the halogenated butyl rubber. This halogenated butyl rubber may then be separated from the slurry by filtration and drying and recovered as a "crumb" or as a dense sheet or slab by conventional hot milling and/or extruding procedures. As so produced the halogenated rubbery copolymer has a Staudinger molecular weight within the range of approximately 20,000 to 300,000, preferably about 25,000 to 200,000, and a mole percent unsaturation of about 0.5 to 15.0.

When the above described halogenated butyl rubber, e.g. chlorinated butyl rubber, is compounded with heavily attrited carbon blacks, e.g. a ball-milled furnace black, the vulcanizates show both increased length and strength. For instance a composition may have an increase of 25% or so in both the elongation and the tensile strength, and of course obviously a great increase in the tensile product. There is likewise a very substantially increased elasticity or suppleness, as indicated by a lowering of the internal viscosity and of the dynamic modulus (K). As there is an increase in the rupture energy (R), there is a very substantial reduction in the ratio $K/R$, which is related to tread wear or abrasion loss.

Although the invention is considered to be outstandingly applicable to the compounding of butyl rubber, nevertheless some substantial improvements can also be effected when compounding the novel carbon blacks of this invention with other types of rubber, such as natural rubber or high unsaturation synthetic rubber such as GR-S (butadiene-styrene rubber), butadiene acrylonitrile rubber, neoprene, etc.

When making any of the above-mentioned types of rubber compounds, particularly in the case of butyl rubber, it may be desirable to add about 5 to 100, preferably about 10 to 30 parts by weight of a plasticizer oil per 100 parts of rubber. Such an oil is desirably a mineral or petroleum oil, of a paraffinic, naphthenic, or aromatic type, having a viscosity of about 35 to 400 S.S.U., preferably about 40 to 200 S.S.U. (Seconds Saybolt Universal) at 210° F., and having a relatively low unsaturation, e.g. I No. below 30 cg./g., so as to not interfere seriously with the curing of the resulting rubber composition. Also, some of the various ester type plasticizers may be used, e.g. dibutyl phthalate, dihexyl sebacate, trioctyl phosphate, etc. An advantage of using for instance 5 to 20 parts of mineral oil plasticizer per 100 parts of butyl rubber compounded with 50 parts of heavily ball-milled furnace black, is that it reduces the abrasion loss ratio: $K/R$, about 20 to 50% compared to a composition containing ball-milled carbon black but without any mineral oil plasticizer, or that it produces a reduction of from about 30 to 60% compared to similar compositions containing the mineral oil plasticizer, but containing ordinary furnace black instead of ball-milled furnace black.

If desired, before adding vulcanizing agents, shaping, and curing, to make finished articles such as auto tires, either of the tube-containing, or of the tubeless type, or of parts thereof such as the carcass, tread, sidewall, or the air-holding innerliner, or for making any other shaped articles, the severely attrited carbon black of this invention may first be mixed with the rubber to be used, particularly a butyl rubber, and then subjected to a heat-interaction, to promote a formation of bonds between the carbon black and the butyl rubber. This heat treatment may be either static, dynamic, as in a Banbury mixer or on heated steel rolls, or a combination cyclic treatment such as by 2 to 10 or 15 repeated cycles of static heating for 10 minutes to an hour, followed by mixing for 1 to 3 or 5 minutes. The heat-treatment should generally be carried out at a temperature of about 250 to 500° F., preferably about 300 to 450° F., inversely for a period of time ranging from about 5 or 10 minutes up to 8 hours. A preferred heat-treatment is mixing in a Banbury at about 300 to 400° F. for about 5 to 15 minutes, or, in the case of static heating, about 1 to 4 hours at about 300 to 350° F. Such a heat-treatment gives a combination of high 300% modulus and high tensile of 50% or so greater than obtained with unattrited carbon black either with or without heat-treatment, and also better than even a ball-milled carbon black without the heat-treatment of the mixture of butyl rubber and carbon black.

Since it is known that channel blacks respond to heat-treatment with butyl rubber without promoters, but furnace and thermal blacks don't respond unless a promoter is present, it is remarkable that the ball-milled furnace and thermal blacks of this invention do respond to heat-treatment with butyl rubber even without any promoter. Thus, by the severe attrition, the furnace and thermal blacks are modified so they behave like channel black, or even are superior to it. These modified products have a low pH (3–5) like channel blacks; but they have lower structure than normal channel blacks have.

The heat-interaction with butyl rubber increases the percent of bound rubber to about 20 to 50%, and thus assists in imparting better elasticity and lower internal viscosity to the products when vulcanized.

If desired, in carrying out such a heat-interaction of the attrited carbon black with butyl rubber or any other type of rubber, various heat-interaction promoters may be used, such as about 0.1 to 1.0% of Polyac (paradinitrosobenzene), GMF (paraquinone-dioxime), sulfur, or various sulfur-containing compounds such as Tuads (tetramethylthiuramdisulfide), paranitrosophenol, N,4 dinitroso-N-methylaniline, etc. When any of these promoters are used, it is preferred to use the dynamic or hot-milling process for effecting the heat-interaction, and it is desirable to not use an excess of the promoter such as may cause scorching.

The details, objects, and advantages of the present invention will be more apparent from the following experimental data.

EXAMPLE 1

Each of seven different types of carbon black was subjected to ball-milling for 24 hours at room temperature in a ball-mill made of porcelain, having a volume capacity of 1¼ gallons, using in each case a charge of 350 grams of the carbon black and 22 pounds of steel balls of ⅝″ diameter, and a speed of about 66 r.p.m. The pH value and the surface area, in square meters per gram (by $N_2$ adsorption method), were measured both before and after the ball-milling. The results are tabulated in the accompanying Table I also showing the percent increase in area due to ball-milling.

Table I
EFFECT OF BALL-MILLING[a] ON PROPERTIES OF THE BLACK
[B-M means ball-milled]

| Type black | pH[b] | | Surface area, M²/gm. (N₂ absorption) | | Percent increase in area (B.M.) |
|---|---|---|---|---|---|
| | Standard | B-M | Standard | B-M | |
| SAF Vulcan 9 | 7.33 | 3.48 | 146 | 175 | 20 |
| MPC Kosmobile S-66 | 4.08 | 3.15 | 136 | 194 | 43 |
| HAF Philblack O | 8.53 | 4.32 | 73 | 114 | 56 |
| HMF Philblack A | 9.08 | 3.83 | 47 | 88 | 87 |
| SRF Gastex | 9.30 | 5.69 | 25 | 98 | 292 |
| FT P-33 | 5.02 | 4.93 | <5 | 30-60 | |
| MT Thermax | 5.20 | 4.00 | | | |

[a] At room temperature, about 20-24 hrs.
[b] pH Test made on a slurry of 5 grams of carbon black in 30 cc. of water, by conventional method.

It is thus seen that the severe attrition due to the ball-milling has effected either a great decrease in pH value or a great increase in surface area, or both. The carbon blacks having a relatively high pH value, in the range of 7 to 10, are reduced the greatest amount (about 40 to 60%) in pH, to the range of 3.5 to 6, whereas the carbon blacks having initially a relatively low pH in the range of 4.0 to 5.2 are only reduced from about 5 to 25 percent. On the other hand, the carbon blacks of fine particle size and large surface area are only increased moderately (about 20 to 50%) in surface area whereas the coarser particles, such as SRF or the thermal blacks, which have a relatively low surface area, are increased manyfold in surface area. It is apparent that very great physical and chemical changes are effected in all of these types of carbon blacks by this severe attrition treatment.

Some pH tests made on small samples withdrawn progressively through the ball-milling runs, showed that most of the lowering of the pH value occurred within the first 10 hours, and in most cases within the first 5 hours, but it is believed that the changes in the chemical nature of the oxygen-containing groups at the surface of the carbon black particles continued to change progressively throughout the entire course of the ball-milling.

Electron micrographs show that the reticulate structure in the carbon black before ball-milling, is substantially reduced by the ball-milling; the distinct chain-like configuration present in the FT black appeared to be mostly dissipated by the attrition.

EXAMPLE 2.—BUTYL RUBBER VULCANIZATES

Ball-milled carbon blacks, such as prepared in Example 1, were compounded with butyl rubber and curatives, according to the formulation given herebelow, and cured, together with a corresponding set of controls using regular (unattrited) carbon blacks of the same types. The butyl rubber used in these tests was an isobutylene-isoprene copolymer, a commercially available grade called Enjay Butyl 217, and it has a Mooney viscosity of 61-70 (8 minutes at 212° F.), and about 1.5-1.9 mole percent unsaturation, herewith referred to as butyl rubber A; the formulation used was as follows:

| | |
|---|---|
| Butyl rubber A | 100.0 |
| Carbon black | 50.0 |
| Stearic acid | 0.5 |
| Zinc oxide | 5.0 |
| Sulfur | 2.0 |
| Tetramethylthiuram disulfide | 1.0 |
| 2,2'benzothiazyldisulfide | 1.0 |

The vulcanizates were cured for 45 minutes at 307° F., along with a corresponding set of samples prepared with regular (unattrited) carbon blacks, and tested for stress-strain properties, the results being set forth in the accompanying Table II.

Table II
BUTYL RUBBER PLUS BALL-MILLED BLACKS
[B-M means ball-milled]

| | SAF Vulcan 9 | | HAF Philblack O | | HMF or FEF Philblack A | | SRF Gastex | | FT P-33 | | LB Lampblack | |
|---|---|---|---|---|---|---|---|---|---|---|---|---|
| | Control | B-M | Control | B-M | Control | B-M | Control | B-M | Control | B-M | Control | B-M |
| Modulus (lbs./in.²) at— | | | | | | | | | | | | |
| 100% | 345 | 280 | 385 | 195 | 440 | 170 | 300 | 180 | 250 | 200 | 330 | 165 |
| 200% | 810 | 600 | 1,010 | 535 | 1,000 | 485 | 640 | 520 | 375 | 400 | 650 | 400 |
| 300% | 1,570 | 1,100 | 1,790 | 1,175 | 1,550 | 1,035 | 950 | 1,215 | 465 | 800 | 880 | 900 |
| 400% | 2,380 | 1,810 | 2,400 | 2,040 | 1,890 | 1,760 | 1,300 | 2,050 | 600 | 1,340 | 1,100 | 1,470 |
| 500% | | 2,565 | | 2,850 | | 2,500 | | | 910 | 1,815 | 1,200 | 1,975 |
| 600% | | | | | | | | | | 2,030 | | 2,220 |
| Tensile strength (lbs./in.²) | 3,020 | 3,140 | 2,500 | 3,170 | 1,890 | 2,840 | 1,550 | 2,550 | 1,270 | 2,030 | 1,200 | 2,310 |
| Elongation (percent) | 490 | 590 | 430 | 560 | 400 | 580 | 470 | 480 | 545 | 600 | 435 | 615 |

The above Table II shows that in the case of the 6 different types of carbon black, including four furnace blacks, one thermal black and a lampblack, the ball-milling effected a substantial increase in the tensile strength and also in the elongation. The amount of the increase in tensile strength due to the ball-milling appears to vary approximately in proportion to the original particle size, i.e. diameter, of the carbon black before ball-milling. Thus, with Vulcan 9, which is a super abrasion furnace black having a diameter of 18 mu, the tensile strength increased from 3020 up to 3140, an increase of about 4%, whereas with Gastex, which is a semi-reinforcing furnace black, having a diameter of 85 mu, the tensile strength increased from about 1600 up to 2500, which is an increase of 56%.

As in most of the cases in the above data, there was some reduction in the 300% modulus, the combination of this with the increase in elongation and tensile strength means that the ball-milled carbon blacks in each case resulted in a butyl rubber composition having superior elastic properties, or enhanced suppleness or flexibility. To emphasize the actual improvement due to the ball-milling of this invention, the increase in tensile strength, elongation, and tensile product (the arithmetic product of the tensile strength times the elongation) are tabulated in Table III.

Table III
EFFECT OF BALL-MILLING ON TENSILE STRENGTH, ELONGATION, AND TENSILE PRODUCT OF BUTYL RUBBER VULCANIZATES

| Black | Particle diam., mu | Δ Tensile strength, lbs./in.² | Δ Elongation, percent | Δ Tensile product |
|---|---|---|---|---|
| Vulcan 9 | 20 | 120 | 100 | 12,000 |
| Philblack O | 35 | 670 | 130 | 87,000 |
| Philblack A | 50 | 950 | 130 | >123,000 |
| Gastex | 80 | 1,000 | 10 | 10,000 |
| P-33 | 75 | 760 | 55 | 41,000 |
| Thermax | 200-300 | 1,300 | 180 | >234,000 |

NOTE.—Δ means increase in.

From the above table it is apparent that with every one of the six carbon blacks, the ball-milling effected a substantial increase in tensile product, which is an indication of increased area under stress-strain curve which means increased usefulness in that it will support higher loads and undergo greater extensions without being ruptured. This is more important than having merely an increase in tensile strength accompanied by a loss in elongation or the reverse, namely an increase in elongation with a loss in tensile strength.

Dynamic property tests were also made on other samples of these same butyl rubber vulcanizates containing the ball-milled carbon blacks, and controls containing regular carbon blacks, and these dynamic properties are set forth in the accompanying Table IV.

Table IV
EFFECT OF BALL-MILLED BLACK ON THE DYNAMIC PROPERTIES OF BUTYL RUBBER VULCANIZATES

[B-M means ball-milled]

| Black | Internal viscosity $\eta f \times 10^{-6}$, poises×c.p.s. | | Dynamic modulus $Ky \times 10^{-7}$, dynes/cm.$^2$ | | Percent relative damping | |
|---|---|---|---|---|---|---|
| | Control | B-M | Control | B-M | Control | B-M |
| Vulcan 9 | 9.37 | 3.27 | 14.0 | 8.38 | 42.3 | 27.0 |
| Philblack O | 4.12 | 1.97 | 10.4 | 6.47 | 27.4 | 21.7 |
| Philblack A | 4.61 | 1.64 | 11.1 | 5.92 | 28.5 | 19.9 |
| Gastex | 1.87 | 1.08 | 7.65 | 5.30 | 17.8 | 15.0 |
| P-33 | 1.27 | 1.09 | 6.47 | 5.33 | 14.6 | 15.2 |
| Lampblack | 2.27 | 0.96 | 8.21 | 5.01 | 19.3 | 14.2 |

The above Table IV shows that in each of the six carbon blacks, the severe ball-milling effected tremendous reduction in internal viscosity, as in the case of Vulcan 9 a reduction from 9.37 to 3.27, and in the case of Gastex a reduction from the relatively lower value of 1.87 down to the extremely low value of 1.08. This means a great improvement in resilience or elastic properties of the butyl rubber compositions due to the ball-milling of the carbon black.

There was also, in each case, some reduction in the dynamic modulus, ranging from the relatively greatest improvement in Philblack A (from 11.1 down to 5.92), but also there being some improvement even in the P-33, in which the control sample showed a dynamic modulus of 6.47, and the ball-milled sample gave an improvement down to 5.33.

Other properties studied are shown in Table V.

Table V
EFFECT OF BALL-MILLED BLACK ON GEL CONTENT OF BUTYL RUBBER, ELECTRICAL RESISTIVITY AND ABRASION RESISTANCE

[B-M means ball-milled]

| Black | Percent bound | | Tests on vulcanizates | | | |
|---|---|---|---|---|---|---|
| | Control | B-M | Abrasion loss, cc./km./amp. | | Elec. resistivity, ohm cm. | |
| | | | Control | B-M | Control | B-M |
| Vulcan 9 | 11 | 31 | 0.71 | 0.54 | | |
| Philblack O | 7.6 | 17 | 0.89 | 0.50 | | |
| Philblack A | 3.8 | 8.3 | 1.10 | 0.47 | 3.30×10$^7$ | 2.35×10$^8$ |

Insoluble polymer or gel is measured using the butyl-carbon black mixture, before the addition of sulfur and accelerators. A portion (~0.5 gm.) of the mixture is diced into 100 cc. of cyclohexane, contained in a stoppered bottle. The bottle is then allowed to stand for 1 week at room temperature, the contents being inverted gently once each day. At the end of this time, an aliquot portion of the clear solution is drawn off and the extent of soluble polymer determined by evaporation. More than twice as much gel is found in this test for ball-milled black systems than is found for similar unmodified black systems. Thus, closer associations of polymer and black are envisioned, associations arising from increased activity on the black surface and from decreased cohesive pigment structure.

From the processing point of view, ball-milled blacks appear to mix more readily with butyl rubber than the original blacks. It is surprising, then, that more evidence for good dispersion is not found in the resulting electrical resistivity data. The only tests made, namely on Philblack A, show only a modest increase in electrical resistivity due to ball-milling of the carbon black.

Abrasion resistance, as measured with the Lambourn abrader, is greatly improved as a result of carbon attrition. Table V shows that the abrasion loss in three butyl vulcanizates is reduced from 25 to 50% when ball-milled black is substituted for standard black. This is an important advantage for use in tire treads, tires, conveyor belts, etc.

As the strength or toughness and resiliency and probably other factors of rubber compositions are interrelated to give a composite effect on the abrasion loss or resistance to wear, and these factors vary somewhat according to the time of cure, the test data on dynamic modulus (K), rupture energy (R), and abrasion loss (K/R) are tabulated herebelow in Table VI, for times of cure ranging from 10 to 75 minutes, at 307° F.

Table VI
EFFECT OF BALL-MILLED PHILBLACK O, DYNAMIC MODULUS (K), RUPTURE ENERGY (R), AND ABRASION LOSS (RATIO K/R), AT VARIOUS CURE TIMES IN BUTYL RUBBER VULCANIZATES

| Time of cure, minutes at 307° F | 10 | 20 | 45 | 75 |
|---|---|---|---|---|
| Dynamic modulus (K) (Ky×10$^{-7}$, in dynes/cm.$^2$): | | | | |
| Control | 8.70 | 9.71 | 10.40 | 10.70 |
| Ball-milled | 6.04 | 6.13 | 6.47 | 6.98 |
| Rupture energy (R) (joules×10$^{-5}$): | | | | |
| Control | 1.44 | 1.13 | 95.9 | 76.5 |
| Ball-milled | 160 | 151 | 134 | 113 |
| Abrasion loss (K/R): | | | | |
| Control | 6.04 | 8.59 | 10.8 | 14.0 |
| Ball-milled | 3.78 | 4.06 | 4.83 | 6.18 |

NOTE: K=dynamic modulus. Ky=dynamic modulus (Yerzley).

The rupture energy is the area under the stress-strain curve, when these data are plotted on a chart.

For good abrasion resistance a butyl rubber vulcanizate should be soft and yet have high tensile strength and elongation. Thus, it should have low dynamic modulus (K) and high rupture energy (R). The ratio, K/R, a single term involving softness, strength and length, is proportional to the abrasion loss, the higher the value of K/R, the greater is the abrasion loss; and therefore the lower the value of K, the better the resistance to wear.

The above data in Table VI show that a ball-milled black (Philblack O) gave a lower dynamic modulus (K), and a higher rupture energy (R), and a much lower abrasion loss (K/R) than corresponding compositions containing the regular (unattrited) carbon black. Furthermore, in regard to all three of these properties, the data for the ball-milled black shows that vulcanizates containing it are less sensitive to overcuring than corresponding compositions containing unattrited black.

Hysteresis measurements with the Goodrich flexometer were also made, on butyl rubber compositions containing ball-milled Philblack O, as well as on control samples containing unattrited carbon black. The data obtained on initial static compression, dynamic drift, percent compression set, and temperature rise, as well as observations on the condition of the vulcanizates compounds at the end of the tests, are tabulated in the accompanying Table VII.

Table VII

EFFECT OF BALL-MILLED BLACK ON HYSTERESIS PROPERTIES OF BUTYL RUBBER VULCANIZATES

[B-M means ball-milled]

| Time of cure, minutes at 307° F | 10 | 20 | 45 | 75 |
|---|---|---|---|---|
| Goodrich flexometer data: | | | | |
| (1) Initial static compression, inches: | | | | |
| Control | | .238 | .192 | .186 | .126. |
| B-M | .290 | .217 | .201 | .190. |
| (2) Dynamic drift, inches: | | | | |
| Control | | .187 | .143 | .124. |
| B-M | .151 | .125 | .109 | .047. |
| (3) Percent compression set: | | | | |
| Control | | 23.0 | 16.6 | 12.4. |
| B-M | 30.5 | 19.2 | 13.7 | 11.0. |
| (4) Temperature rise, °C.: | | | | |
| Control | | 45.5 | 30.0 | 28.0. |
| B-M | 29.0 | 28.0 | 25.5 | 24.0. |
| (5) Condition: | | | | |
| Control | | Blown | Very porous | Porous | Slightly porous. |
| B-M | Porous | Very slightly porous | No porosity | No porosity. |

The above hysteresis data in Table VII indicate that with regular (unattrited) Philblack O, it is necessary to cure the butyl rubber compound for 75 minutes to prevent development of undesirable porosity in the flexometer test, whereas with the ball-milled black even just a 20 minute cure was sufficient to give substantially equal protection against development of porosity. Similarly whereas regular black required 75 minute cure to hold the flexing temperature rise (degrees C.) down to 28.0, the ball-milled black composition when only cured 20 minutes did not exceed 28.0 degree temperature rise. Likewise, the butyl rubber compositions containing ball-milled Philblack O had desirably low dynamic drift and compression set with much shorter curing times than required for the regular unattrited black.

The ability to obtain good hysteresis performance with short curing time, e.g. 20 to 30 minutes or so, is very important because the abrasion resistance was shown, above, under Table VI, as being best with low curing time (i.e. 10 minute and 25 minute cures were much better than 45 to 75 minute cures).

Thus, the ball-milled carbon blacks of this invention now provide for the first time carbon black-reinforced butyl rubber compositions having an excellent combination of low abrasion loss and low hysteresis properties.

Thus, these compositions are outstandingly superior for use in tires, of either the tube-containing or tubeless types, for autos, trucks, airplanes, etc., or for tread surfaces to be applied onto a carcass of any type of rubber. These compositions also give outstandingly superior service in other industrial applications where they are subject to both abrasion and repeated flexing, such as conveyor belts for handling crushed stone, ore, coal, or other materials having an abrading influence, etc., as well as other uses such as shoes, boots, tractor treads, fan belts, power transmission belts, etc.

Plasticizer oil may be used in butyl rubber compositions, especially to be used for tire treads, etc., to improve abrasion resistance. Extensibility of the vulcanizate is increased and dynamic modulus is decreased, with the result that lower values of K/R, representing abrasion loss, are obtained. The accompanying Table VIII shows the effect of a ball-milled carbon black (Philblack O) on a butyl rubber composition containing from 0 to 20 parts of mineral oil plasticizer per 100 parts of butyl rubber, the formulation used being otherwise essentially the same as that used in the preceding test. The mineral oil used was an acid-treated paraffinic petroleum distillate fraction having a viscosity of about 40 SSU (Seconds Saybolt Universal) at 210° F., and commercially available under the trade name "Forum 40" now called "Faxam 40." The accompanying table gives the data on K/R, representing abrasion loss, for both the ball-milled carbon black samples and a corresponding set of control samples containing unattrited carbon black. All samples were cured 45 minutes at 307° F.

Table VIII

| Parts oil | 0 | 5 | 10 | 20 |
|---|---|---|---|---|
| K/R: | | | | |
| Control | 10.8 | 8.25 | 6.36 | 6.11 |
| Ball-milled black | 4.83 | 4.04 | 3.30 | 2.80 |

The above data in Table VIII show that with a ball milled Philblack O, the K/R of the butyl rubber compositions is reduced from about 4.8 with no plasticizer oil successively down to 4.0 with 5 parts of oil and eventually down to about 2.8 with 20 parts of oil plasticizer. This means that although the abrasion loss without plasticizer is very good, it is improved even further by the addition of 5 to 10 or 20 p.h.p. (parts per hundred parts of butyl rubber). On the other hand, with regular (unattrited carbon black), the K/R is undesirably high, i.e. about 10.8 without any plasticizer and then is reduced successively to about 6.0 with 5 parts of oil, and then appears to level off at about 6.2 regardless of how much plasticizer oil is used, i.e. 10 or 20 p.h.p. Thus, no matter how much plasticizer is used with unattrited carbon black it is impossible to obtain compositions having as low K/R (abrasion loss) as obtained with the ball-milled carbon black either without plasticizer oil; and, with ball-milled black and plasticizer oil, the abrasion loss is only about half as much as that obtained with the best plasticized compositions with regular (unattrited carbon black).

Heat-treatment of mixtures of ball-milled carbon black and butyl rubber, prior to final shaping and curing, effects still further improvements, chiefly in respect to obtaining a high modulus (e.g. at 300% extension), while at the same time obtaining a high tensile strength and low internal viscosity, low percent relative damping, and low abrasion loss, as well as a great increase in electrical resistivity.

The accompanying Table IX shows the effect of ball-milled blacks, in heat treatment on butyl rubber compositions, compared to heat-treated control samples containing the same unattrited blacks. Data are given on the modulus at extensions ranging from 100 to 500%, and on tensile strength, elongation and dynamic properties. The formulations used were the same as used in obtaining the data set forth in Table II, except that the butyl rubber, carbon black, and stearic acid were first subjected to heat-treatment for 4 hours in open steam at 300–320° F. After the heat-treatment the composition was thoroughly mixed on the mill, and cooled below 120° F., and then other compounding ingredients, including curatives, etc., i.e. zinc oxide, sulfur, tetramethylthiuram disulfide, and 2,2'-benzothiazyldisulfide, were added with good mixing, and finally the compositions were cured for 45 minutes at 307° F.

and at the same time a tremendous reduction in internal viscosity ($\eta f$) from 3.86 down to the extremely low value of 1.02, a great reduction in percent relative damping from 25.9 down to 13.9, the reduction in abrasion loss from 11.11 down to 0.48, and a tremendous increase in electrical resistivity from $4.087 \times 10^7$ to above $10^{15}$. Thus, this vulcanized heat treated composition of butyl rubber and ball-milled Philblack A carbon black had an outstanding combination of superior properties, never heretofore obtained with butyl rubber and carbon black.

The actual heat-treatment response, per se, of butyl rubber compositions containing ball-milled carbon black is shown in Table X, where the corresponding data on unheattreated and heattreated ("HT") samples are assembled from previous Tables II, IV, V and IX.

Table IX

HEAT-TREATED COMPOSITIONS OF BUTYL RUBBER PLUS BALL-MILLED BLACKS
["B–M" means ball-milled]

|  | SAF Vulcan 9 | | HAF Philblack O | | HMF Philblack A | |
|---|---|---|---|---|---|---|
|  | Control | B–M | Control | B–M | Control | B–M |
| Modulus, at (lbs/in.²): | | | | | | |
| 100% | 350 | 305 | 390 | 245 | 425 | 200 |
| 200% | 960 | 750 | 1,100 | 760 | 1,050 | 615 |
| 300% | 1,930 | 1,495 | 1,975 | 1,790 | 1,665 | 1,590 |
| 400% | 2,850 | 2,380 | 2,600 | 2,790 | | 2,740 |
| 500% | | | | | | |
| Tensile strength, lbs./in.² | 3,220 | 2,850 | 2,600 | 2,980 | 1,945 | 3,020 |
| Percent elongation | 450 | 470 | 400 | 430 | 370 | 435 |
| $f\eta \times 10^{-6}$, poises $\times$ cps | 6.87 | 2.28 | | | 3.86 | 1.02 |
| $K y \times 10^{-7}$, dynes/cm.² | 11.9 | 7.41 | | | 10.4 | 5.50 |
| Percent relative damping | 37.5 | 21.9 | | | 25.9 | 13.9 |
| Abrasion loss, cc./km./amp | 0.68 | 0.45 | 0.50 | 0.53 | 1.11 | 0.48 |
| Percent insoluble polymer | 25 | 45 | 14 | 30 | 8.0 | 20 |
| Elec. resistivity, ohm cm | | | | | $4.07 \times 10^7$ | $>10^{15}$ |

Table X

HEAT-TREATMENT RESPONSE OF BUTYL RUBBER VULCANIZATES CONTAINING BALL-MILLED CARBON BLACK

|  | SAF Vulcan 9 | | HAF Philblack O | | HMF Philblack A | |
|---|---|---|---|---|---|---|
|  | Control | HT | Control | HT | Control | HT |
| Modulus at (lbs./in.²): | | | | | | |
| 100% | 280 | 305 | 195 | 245 | 170 | 200 |
| 200% | 600 | 750 | 535 | 760 | 485 | 615 |
| 300% | 1,100 | 1,495 | 1,175 | 1,790 | 1,035 | 1,590 |
| 400% | 1,810 | 2,380 | 2,040 | 2,790 | 1,760 | 2,740 |
| 500% | 2,565 | | 2,850 | | 2,500 | |
| Tensile strength, lbs./in.² | 3,140 | 2,850 | 3,170 | 2,980 | 2,840 | 3,020 |
| Percent elongation | 590 | 470 | 560 | 430 | 580 | 435 |
| $\eta f \times 10^{-6}$, poises $\times$ cps | 3.27 | 2.28 | | | 1.64 | 1.02 |
| $K y \times 10^{-7}$, dynes/cm.² | 8.38 | 7.41 | | | 5.94 | 5.50 |
| Percent relative damping | 27.0 | 21.9 | | | 19.9 | 13.9 |
| Abrasion loss, cc./km./amp | 0.54 | 0.45 | 0.91 | 0.53 | 0.47 | 0.48 |
| Percent insoluble polymer | 31 | 45 | 17 | 30 | 8.3 | 20 |
| Elec. resistivity, ohm cm | | | | | $2.4 \times 10^8$ | $>10^{15}$ |

The data in the above Table IX show, as in the case of Vulcan 9, that although the 300% modulus is somewhat reduced, in the case of ball-milling, there was a tremendous improvement in the elastic properties, as indicated for instance by the lowering of the internal viscosity ($\eta f$) from 6.87 down to 2.28, and a lowering of the abrasion loss from 0.68 to 0.45, due to the ball-milled black.

As to Philblack O, heat treatment of the butyl rubber composition containing the ball-milled carbon black gave both a higher tensile strength and a higher elongation, therefore a higher tensile product than the heat treated control containing regular (unattrited) carbon black. It should be noted here that although the 300% modulus with the ball-milled black (i.e. 1790) is slightly lower than the 1975 obtained with similar heat treatment of the unattrited carbon black composition, yet the 1790 is far superior to the corresponding 300% modulus of 1175 shown in Table II for this same ball-milled carbon black composition but not subjected to heat treatment. Perhaps the most remarkable improvements are shown in the above Table IX, in the case of Philblack A where heat treatment of the ball-milled black composition gave the combination of a much higher increase in tensile strength (from 1945 to 3020) and also an increase in elongation (370 to 435), therefore a big increase in tensile product, These data show, that for three different carbon blacks, each ball-milled, the heat-treatment always effects a marked increase in 300% modulus (e.g., from 1,100 to 1,495 for Vulcan 9), a substantial lowering of internal viscosity (e.g., from 1.64 to 1.02 for Philblack A), and a large increase in percent insoluble polymer (e.g., 17 to 30% for Philblack O). Also, in the Philblack A compositions, heat-treatment raised the electrical resistivity from $2.4 \times 10^8$ to above $10^{15}$.

Although the invention shows the most outstanding results when the type of rubber used is butyl rubber, nevertheless the use of ball-milled carbon black has shown quite unobvious advantages in compositions of natural rubber, GR–S (butadiene-styrene) synthetic rubber, and Hycar OR–15 (a copolymer of 85% butadiene and 15% acrylonitrile). The accompanying Table XI shows strength and elastic property data on vulcanizates on those three types of rubber with a ball-milled high abrasion furnace black (Philblack O), along with data on corresponding control samples containing regular (unattrited) carbon black. The formulation used here was similar to that used in the tests reported in Table III and the same curatives and curing conditions were used.

Table XI
HIGH UNSATURATION RUBBER COMPOSITIONS

| Polymer Philblack O (HAF) | Natural rubber | | GR-S | | Hycar OR-15 | |
|---|---|---|---|---|---|---|
| | Standard | Ball-milled | Standard | Ball-milled | Standard | Ball-milled |
| Modulus at (lbs./in.$^2$): | | | | | | |
| 100% | 625 | 350 | 360 | 600 | 650 | 400 |
| 200% | 1,560 | 875 | 1,040 | 415 | 1,810 | 950 |
| 300% | 2,610 | 1,755 | 1,980 | 840 | 3,000 | 2,000 |
| 400% | | 2,800 | 2,720 | 1,430 | | 3,065 |
| 500% | | | | 2,075 | | 3,950 |
| 600% | | | | 2,845 | | |
| Tensile strength, lbs./in.$^2$ | 3,465 | 3,505 | 2,920 | <3,325 | 3,850 | <4,240 |
| Percent elongation | 380 | <470 | 410 | <655 | 385 | <560 |
| Dynamic properties: | | | | | | |
| (1) $\eta f \times 10^{-6}$, poises×cps | 3.01 | >1.68 | 3.64 | | 6.77 | 5.33 |
| (2) $K \times 10^{-7}$, dynes/cm.$^2$ | 11.9 | 7.97 | 11.0 | | 16.4 | 13.7 |
| (3) Percent relative damping | 22.2 | 18.8 | 28.0 | | 33.8 | 32.3 |
| Electrical resistivity, ohm cm | 2.01×10$^8$ | 8.28×10$^9$ | 1.15×10$^9$ | 1.62×10$^{10}$ | 5.06×10$^9$ | 7.12×10$^{10}$ |

The data in the above Table XI shows that in the case of each of the three types of high unsaturation rubber (natural rubber, butadiene-styrene rubber, and butadiene-acrylonitrile rubber) the ball-milled carbon black gave a substantially higher tensile strength, higher elongation, and therefore higher tensile product, than the corresponding control samples containing unattrited carbon black. Likewise, the ball-milled carbon black gave better elastic properties.

Heat treatment of the compositions of the same high unsaturation rubbers and ball-milled carbon black, as shown in the accompanying Table XII, gave similar increases in tensile strength, percent elongation, and tensile product, but give relatively higher modulus (e.g. at 200% extension) than any corresponding compositions which have not been heat treated, and have the additional important unobvious advantage of a substantially greater reduction in internal viscosity, i.e., a greater improvement in elastic or resiliency properties.

Table XII
HEAT-TREATED HIGH UNSATURATION RUBBER COMPOSITIONS

| Philblack O (HAF) | Natural Rubber | | GR-S | | Hycar OR-15 | |
|---|---|---|---|---|---|---|
| | Standard 1H | Ball-milled 2H | Standard 3H | Ball-milled 4H | Standard 5H | Ball-milled 6H |
| Modulus at (lbs./in.$^2$): | | | | | | |
| 100% | 695 | 380 | 415 | 315 | 660 | 395 |
| 200% | 1,825 | 1,125 | 1,440 | 1,035 | 2,360 | 1,260 |
| 300% | | 2,365 | 2,875 | 2,470 | 4,100 | 3,100 |
| 400% | | | | | | |
| Tensile strength, lbs./in.$^2$ | 2,975 | 3,370 | 3,300 | 3,860 | 4,290 | 4,200 |
| Percent elongation | 295 | 375 | 340 | 425 | 315 | 370 |
| Dynamic properties: | | | | | | |
| (1) $\eta f \times 10^{-6}$, poises×cps | 2.49 | 1.22 | 3.24 | 2.14 | 5.14 | 4.22 |
| (2) $K \times 10^{-7}$, dynes/cm.$^2$ | 11.6 | 7.48 | 11.3 | 9.26 | 16.0 | 12.7 |
| (3) Relative damping (percent) | 22.3 | 15.0 | 24.8 | 20.5 | 30.1 | 28.2 |

A still further modification of the invention is the use of attrited carbon blacks with halogen-containing butyl rubber, as shown in the following Table XIII which sets forth the strength and elasticity property data on vulcanizates of a chlorinated butyl rubber and ball-milled HAF (high abrasion furnace black), Philblack O. The carbon black was ball-milled in a manner similar to that used in the previous examples, but in this case was ball-milled for 54 hours instead of 24 hours. The chlorinated butyl rubber used was made by mild room temperature chlorination of a commercial butyl rubber called Enjay Butyl 218, which is an isobutylene-isoprene copolymer rubber having an 8-minute Mooney viscosity of about 71 to 80, and about 1.5 to 1.9 mole percent unsaturation. The chlorinated butyl rubber contained 1.99% of chlorine. Proportions used in the compounding formulation were the same as those in the previous examples of butyl rubber. The compounds were prepared in conventional manner on a 6 inch by 12 inch open mill, and the vulcanizates were cured for 45 minutes at 307° C. The test data on the vulcanizates are shown in the accompanying Table XIII.

Table XIII
COMPARISON OF PHYSICAL PROPERTIES OF CHLORINATED BUTYL RUBBER VULCANIZATES WITH STANDARD AND BALL-MILLED H.A.F., RESPECTIVELY

| Condition of black | Standard | Ball-milled |
|---|---|---|
| Modulus at (lbs./in.$^2$): | | |
| 100% | 300 | 210 |
| 200% | 870 | 550 |
| 300% | 1,710 | 1,350 |
| 400% | 2,400 | 2,310 |
| 500% | | 3,000 |
| Tensile strength, lbs./in.$^2$ | 2,675 | 3,300 |
| Percent elongation | 470 | 580 |
| Dynamic properties: | | |
| (1) $\eta f \times 10^{-6}$ poises×cps | 5.32 | 2.02 |
| (2) $Ky \times 10^{-7}$ dynes/cm.$^2$ | 10.0 | 6.29 |
| (3) Percent relative damping | 41.6 | 27.4 |

These data show that the use of ball-milled carbon black resulted in some very substantial increases in tensile strength, percent elongation and tensile product, with simultaneous great reduction in internal viscosity ($\eta f$) i.e., from 5.32 down to 2.02. This is even better than obtained with ball-milled carbon black and conventional butyl rubber, where, as shown in Table II and Table IV, the use of ball-milled Philblack O reduced the internal viscosity ($\eta f$) from 5.89 down to 3.62. Thus, the chlorinated butyl rubber composition containing ball-milled carbon black gave both superior strength and elastic properties compared to either regular butyl rubber compositions containing the ball-milled carbon black or compared to either regular butyl or chlorinated butyl rubber containing the regular (unattrited) carbon black.

The ratio $K/R$ (representing abrasion loss) is only 4.22 for chlorinated butyl rubber containing the ball-milled Philblack O, compared to 9.78 for a similar composition of chlorinated butyl rubber containing the regular (unattrited) Philblack O, and compared to 7.39 for a conventional butyl rubber containing ball-milled Philblack O, and further compared with 12.6 for a conventional butyl rubber with a conventional (unattrited) Philblack O.

Thus, the combination chlorinated butyl rubber and the ball-milled carbon black of this invention give an extremely unobvious combination of superior properties.

The promoter called Elastopar (N-methyl-N,4-dinitrosoaniline) is an efficient interaction promoter for compositions of butyl rubber and carbon black, especially when the carbon black has been ball-milled according to the present invention. Table XIV and Table XV, show respectively the properties of vulcanizates of un-heat-treated and heat-treated Elastopar-promoted compositions of butyl rubber with ball-milled Philblack O (an HAF furnace black).

*Table XIV*

ELASTOPAR-PROMOTED BUTYL RUBBER COMPOUNDS WITH BALL-MILLED H.A.F. BLACK

| Elastopar, p.h.p. | | 0.5 | 1.0 | 1.5 | 2.5 | 3.5 |
|---|---|---|---|---|---|---|
| Modulus at (lb./in.$^2$): | | | | | | |
| 100% | 195 | 240 | 250 | 250 | 245 | 270 |
| 200% | 460 | 580 | 650 | 665 | 640 | 785 |
| 300% | 920 | 1,250 | 1,435 | 1,510 | 1,350 | 1,640 |
| 400% | 1,585 | 2,145 | 2,390 | 2,415 | 2,185 | 2,425 |
| 500% | 2,340 | 2,950 | 3,015 | 3,130 | | |
| 600% | 2,900 | | | | | |
| Tensile strength, lbs./in.$^2$ | 2,950 | 3,055 | 3,015 | 3,130 | 2,585 | 2,930 |
| Percent elongation | 615 | 525 | 500 | 500 | 470 | 485 |
| Dynamic properties: | | | | | | |
| (1) $\eta f \times 10^{-6}$, poises × cps | 2.15 | 1.36 | 1.29 | 1.27 | 1.63 | 1.50 |
| (2) $K \times 10^{-7}$, dynes/cm | 6.66 | 5.98 | 6.10 | 6.20 | 6.66 | 6.56 |
| (3) Percent relative damping | 27.5 | 20.2 | 19.0 | 18.3 | 21.5 | 20.2 |
| Electrical resistivity, ohm. cm | $7.16 \times 10^7$ | $1.89 \times 10^8$ | $4.50 \times 10^{11}$ | $4.00 \times 10^{13}$ | $7.47 \times 10^{13}$ | $7.78 \times 10^{14}$ |

*Table XV*

HEAT-TREATED ELASTOPAR-PROMOTED BUTYL RUBBER COMPOUNDS WITH BALL-MILLED H.A.F. BLACK

| Elastopar, p.h.p. | | 0.5 | 1.0 | 1.5 | 2.5 | 3.5 |
|---|---|---|---|---|---|---|
| Modulus at (lbs./in.$^2$): | | | | | | |
| 100% | 220 | 240 | 225 | 220 | 245 | 250 |
| 200% | 600 | 680 | 760 | 760 | 850 | 855 |
| 300% | 1,300 | 1,585 | 1,815 | 1,815 | 2,040 | 2,050 |
| 400% | 2,160 | 2,650 | 2,940 | 2,950 | | |
| 500% | 2,990 | | | | | |
| Tensile strength, lbs./in.$^2$ | 3,125 | 3,275 | 3,500 | 3,215 | 3,210 | 3,125 |
| Percent elongation | 530 | 475 | 475 | 450 | 415 | 400 |
| Dynamic properties: | | | | | | |
| (1) $\eta f \times 10^{-6}$, poises × cps | 1.73 | 1.28 | 1.16 | 1.19 | 1.17 | 1.32 |
| (2) $K \times 10^{-7}$, dynes/cm.$^2$ | 6.32 | 5.98 | 5.95 | 5.98 | 5.91 | 6.35 |
| (3) Percent relative damping | 23.8 | 19.1 | 17.6 | 18.0 | 17.8 | 18.6 |
| Electrical resistivity, ohm.cm | $1.09 \times 10^8$ | $9.35 \times 10^{13}$ | $8.48 \times 10^{13}$ | $7.81 \times 10^{13}$ | $7.24 \times 10^{13}$ | $8.52 \times 10^{13}$ |

Even 0.5 part of Elastopar is effective in increasing the 300% modulus, tensile, and electrical resistivity, and reducing internal viscosity ($\eta f$). Best results are obtained with 0.5, 1.0, and 1.5 P.H.P. of Elastopar.

Five different carbon blacks (2 furnace, 1 thermal, 1 channel and 1 acetylene) were subjected to steel ball-milling, as in Example 1, and were tested, before and after the ball-milling, for pH, area, and structure in order to determine the increase in the calculated "activity" factor X, by the previously mentioned formula:

$$X = \frac{2000 + 100A}{\text{pH} \times S}$$

where A is area (acres/lb.), and S is structure (oil absorption, gal./100 lbs.). The data are given in Table XVI, also including data on percent $O_2$ (by Untersacher direct combustion method) for several blacks before and after ball-milling.

The above Table XVI shows that the severe attrition of all four major types of carbon black effected profound changes in their physical and chemical nature. The X value was increased from original figures in the range of 13 to 73, up to the range of 81 to 169. P-33, fine thermal black, which has a low structure (4.8) to begin with, was given an X increase of 38%, whereas Shawinigan acetylene black, which has a high structure (33.8), was given a 908% increase in X value.

A time study was made of the ball-milling of an acetylene (Shawinigan) black with steel balls as compared to flint pebbles, at various intervals of time up to 66 hours. The data on pH, area, structure, X value, and percent $O_2$ are shown in Table XVII.

*Table XVI*

EFFECT OF SEVERE BALL-MILLING ON FIVE CARBON BLACKS

| Carbon black type | | Control | | | | Ball-milled (24 hrs., steel balls) | | | | $X = \frac{2000+100A}{\text{pH} \times S}$ | | |
|---|---|---|---|---|---|---|---|---|---|---|---|---|
| Symbol | Tradename | pH | Area | Struct. | Percent $O_2$ | pH | Area | Struct. | Percent $O_2$ | Control | B-M | Percent increase |
| HAF | Philblack O | 8.3 | 8.61 | 13.0 | 0.95 | 5.0 | 10.41 | 7.3 | 1.60 | 26.5 | 83.3 | 214 |
| HMF | Philblack A | 6.6 | 5.47 | 14.2 | .47 | 3.2 | 13.10 | 7.92 | 1.69 | 27.2 | 130.5 | 380 |
| FT | P-33 | 7.6 | 1.57 | 4.8 | | 5.9 | 2.13 | 4.56 | | 59.0 | 81.8 | 38.6 |
| MPC [1] | Kosmobile S66 | 4.25 | 15.35 | 11.4 | | 3.5 | 27.30 | 7.98 | | 73.0 | 169.0 | 131 |
| Acet | Shawinigan | 5.85 | 7.05 | 33.8 | .13 | 3.6 | 20.05 | 8.04 | 1.49 | 13.7 | 138.0 | 908 |

[1] Degassed; ball-milled under $N_2$.

"Structure" is oil absorption in gal./100 lbs.; "area" is acres/lb.

Table XVII

TIME STUDY OF BALL-MILLING SHAWINIGAN (ACET.) BLACK WITH STEEL AND FLINT BALLS

| | Steel | | | | | Stone | | | | $X=\frac{2{,}000+100A}{\text{pH} \times S}$ | | |
|---|---|---|---|---|---|---|---|---|---|---|---|---|
| | pH | Area | Struct. | X | Percent O₂ | pH | Area | Struct. | Percent O₂ | Stone | Steel | Percent Increase |
| Hrs. | | | | | | | | | | | | |
| 0 | 5.85 | 7.05 | 33.8 | 13.7 | .13 | 5.85 | 7.05 | 33.8 | .13 | 13.7 | 13.7 | 0 |
| 2 | 4.8 | 7.84 | 17.7 | 32.7 | .14 | | | | | | 32.7 | |
| 4 | 4.2 | 8.73 | 9.6 | 71.0 | .25 | | | | | | 71.0 | |
| 8 | 3.6 | 8.85 | 9.5 | 84.3 | .28 | 5.45 | 6.60 | 28.8 | .08 | 17.0 | 84.3 | 395 |
| 16 | 3.45 | 19.02 | 7.8 | 145.0 | 1.14 | 5.15 | 6.50 | 24.7 | .13 | 20.8 | 145.0 | 600 |
| 24 | 3.3 | | 8.4 | | 1.32 | | | | | | | |
| 66 | | | | | | 4.0 | | 11.6 | .25 | | | |
| Percent Increase in X in 16 hrs. | | | | | | | | | | 52 | 960 | |

Note.—$X=\frac{2{,}000+100A}{\text{pH} \times S}$

The above table shows that light ball-milling with flint pebbles even for 16 hours does not effect any substantial change in the acetylene (high-structure) black, as the X value merely increased 52% (from 13.7 to 2.08), whereas the steel ball-milling for 16 hours raised the X value to 145, namely a 960% increase. With the pebbles, there was substantially no change in oxygen content of the carbon black, but with the steel ball-milling, there was a 9-fold increase in oxygen in 16 hours.

To show that attrition methods other than ball-milling can be used, some Philblack A furnace black was passed three times through a pair of rubber mill rolls, with a tight setting of 0.007 inch between the steel rolls. The structure (oil absorption value) was reduced from 14.2 to 7.38, and the pH reduced from 6.6 to 5.5.

Butyl rubber vulcanizates were made with this attrited carbon black, using 50 p.p.h. of black, and the same compounding and curing formulation as used in example. Data obtained, with corresponding unattrited control samples, are shown in Table XVIII.

Table XVIII

PHILBLACK A ATTRITED BETWEEN STEEL ROLLS

| | Control | Attrited |
|---|---|---|
| Tensile strength, lbs./in.² | 2,080 | 2,460 |
| Percent elongation | 410 | 515 |
| Modulus at 300% | 1,610 | 1,010 |
| Electrical resistivity (ohm cm.) | 8.01×10⁷ | 3.18×10¹³ |
| Dynamic properties: | | |
| (1) $\eta f \times 10^{-6}$, poises×cps | 2.98 | 1.44 |
| (2) $K \times 10^{-7}$, dynes/cm.² | 8.76 | 5.57 |
| (3) Relative damping (%) | 23.9 | 18.8 |

These data (Table XVIII) show that severe attrition of furnace black (Philblack A), by 3 passes through tight-set steel rolls, effects a substantial increase in tensile strength (2080 to 2460), elongation, and electrical resistivity, and also a real improvement in elastic properties, as indicated by reduction in the internal viscosity ($\eta f$) from 2.98 to 1.44.

It is not intended that this invention be limited to the specific modifications which have been given merely for the sake of illustration but only by the appended claims in which it is intended to claim all novelty inherent in the invention as well as all modifications coming within the scope and spirit of the invention.

What is claimed is:

1. As a new product, a carbon black formed by severe attrition by contact with a hard surface, said carbon black having an X value of above 80 where:

$$X=\frac{2{,}000+100A}{\text{pH} \times S}$$

where A is the area (in acres/lb.), and S is the structure (in gal. of oil absorbed/100 lb. of carbon black), said carbon black being able to simultaneously increase the tensile product of a butyl rubber vulcanizate while decreasing its internal viscosity when used as a rubber filler.

2. Product according to claim 1 having a pH of about 2 to 5.9, a structure of about 4 to 8, gals. of oil absorbed per 100 lbs. of black derived from a carbon black having a pH of from 6 to 10, and having a structure of 8.1 to 40 gals. of oil absorbed per 100 lbs. of black and an X value of 10 to 75.

3. A process for producing modified carbon black having improved compounding characteristics which comprises subjecting to severe attrition by contact with a hard surface a carbon black having an X value of 10 to 75, under conditions of sufficient severity and duration to raise the X value to the range of 80 to 200, where:

$$X=\frac{2{,}000+100A}{\text{pH} \times S}$$

where A is the area (in acres/lb.), and S is the structure (in gal. of oil absorbed/100 lb. of carbon black).

4. As a new product, a carbon black formed by severe attrition by contact with a hard surface, said carbon black having an X value of at lest 100 where:

$$X=\frac{2{,}000+100A}{\text{pH} \times S}$$

where A is the area (in acres/lb.), and S is the structure (in gal. of oil absorbed/100 lb. of carbon black), said carbon black simultaneously being able to increase the tensile product of a butyl rubber vulcanizate while decreasing its internal viscosity when used as a rubber filler.

5. As a new product, a carbon black formed by severe attrition by contact with a hard surface, said carbon black having an X value of about 130 to 170 where:

$$X=\frac{2{,}000+100A}{\text{pH} \times S}$$

where A is the area (in acres/lb.), and S is the structure (in gal. of oil absorbed/100 lb. of carbon black), said carbon black being able to simultaneously increase the tensile product of a butyl rubber vulcanizate while decreasing its internal viscosity when used as a rubber filler.

6. As a new product, a furnace black having an X value in the range of about 83 to 130 where:

$$X=\frac{2{,}000+100A}{\text{pH} \times S}$$

where A is the area (in acres/lb.), and S is the structure (in gal. of oil absorbed/100 lb. of carbon black), said black having been formed by severe attrition by contact with a hard surface.

7. As a new product, a thermal black having an X value of at least about 81 where:

$$X = \frac{2{,}000 + 100A}{\text{pH} \times S}$$

where A is the area (in acres/lb.), and S is the structure (in gal. of oil absorbed/100 lb. of carbon black), said black having been formed by severe attrition by contact with a hard surface.

8. As a new product, an acetylene black having an X value at least as high as the range of about 80 to 138, where:

$$X = \frac{2{,}000 + 100A}{\text{pH} \times S}$$

where A is the area (in acres/lb.), and S is the structure (in gal. of oil absorbed/100 lb. of carbon black), said black having been formed by severe attrition by contact with a hard surface.

9. The process of claim 7 for producing modified carbon blacks having improved compounding characteristics wherein said carbon black is subjected to severe attrition equivalent to ball-milling with steel balls for at least four hours.

10. The process of claim 7 for producing modified carbon blacks having improved compounding characteristics wherein said carbon black is subjected to ball-milling with steel balls for at least four hours.

11. A process for producing modified carbon black having improved compounding characteristics which comprises subjecting a furnace black having an X value of about 25 to 35 to ball-milling with steel balls until its X value has been increased to at least about 83 to 130, where:

$$X = \frac{2{,}000 + 100A}{\text{pH} \times S}$$

where A is the area (in acres/lb.), and S is the structure (in gal. of oil absorbed/100 lb. of carbon black).

12. A process for producing modified carbon black having improved compounding characteristics which comprises subjecting a thermal black having an X value of about 40 to 60 to ball-milling with steel balls until its X value has been increased at least to about 81, where:

$$X = \frac{2{,}000 + 100A}{\text{pH} \times S}$$

where A is the area (in acres/lb.), and S is the structure (in gal. of oil absorbed/100 lb. of carbon black).

13. A process for producing modified carbon black having improved compounding characteristics which comprises subjecting an acetylene black having an X value of about 10 to 25 to ball-milling with steel balls until its X value has been increased at least to the range of about 84 to 138, where:

$$X = \frac{2{,}000 + 100A}{\text{pH} \times S}$$

where A is the area (in acres/lb.), and S is the structure (in gal. of oil absorbed/100 lb. of carbon black).

14. A process for producing modified carbon black having improved compounding characteristics which comprises subjecting a channel black having an X value below about 75 to ball-milling with steel balls until its X value has been increased to the vicinity of 169, where:

$$X = \frac{2{,}000 + 100A}{\text{pH} \times S}$$

where A is the area (in acres/lb.), and S is the structure (in gal. of oil absorbed/100 lb. of carbon black).

15. A process for producing modified carbon black having improved compounding characteristics which comprises subjecting a carbon black having a pH of 6 to 10, a structure of 8.1 to 40 gals. of oil absorbed per 100 lbs. of black, and having an X value of 10 to 75, to ball-milling with steel balls at a temperature of about 20 to 100° C. in the presence of an oxygen-containing gas for a period of 1 to 24 hours until the X value of the ball-milled carbon black is about 80 to 200 where:

$$X = \frac{2{,}000 + 100A}{\text{pH} \times S}$$

wherein A is the area in acres per lb. and S is the structure in gals. of oil absorbed per 100 lbs. of carbon black.

16. As a new product, a carbon black formed by severe attrition by contact with a hard surface, said black having been derived from a member of the group consisting of furnace blacks, thermal blacks, channel blacks, and acetylene blacks, and having an X value of above 80 where:

$$X = \frac{2{,}000 + 100A}{\text{pH} \times S}$$

wherein A is the area in acres per lb. and S is the structure in gals. of oil absorbed per 100 lbs. of carbon black.

17. As a new product, a carbon black formed by severe attrition by contact with a hard surface, said black having been derived from a member of the group consisting of furnace blacks, thermal blacks, acetylene blacks, and channel blacks, and having an X value of at least 100 where:

$$X = \frac{2{,}000 + 100A}{\text{pH} \times S}$$

wherein A is the area in acres per lb. and S is the structure in gals. of oil absorbed per 100 lbs. of carbon black.

18. The product of claim 4 having a pH of 2 to 5.9, a structure of about 4 to 8 gals. of oil absorbed per 100 lbs. of black which was derived from a carbon black having a pH of 6 to 10, a structure of 8.1 to 40 gals. of oil absorbed per 100 lbs. of black, and an X value of 10 to 75.

References Cited in the file of this patent

UNITED STATES PATENTS

| Number | Name | Date |
| --- | --- | --- |
| 2,066,274 | Grote | Dec. 29, 1936 |
| 2,439,442 | Amon et al. | Apr. 13, 1948 |
| 2,509,664 | Amon et al. | May 30, 1950 |
| 2,597,741 | Macey | May 20, 1952 |
| 2,890,839 | Heller | June 16, 1959 |

OTHER REFERENCES

Dobbin et al.: "Ind. and Eng. Chem.," 38, 1145–1148 (1946).

Drogin et al.: "Today's Furnace Blacks," pp. 36–39, 1948, United Carbon Co., Inc. (Maryland).

Sperberg et al.: "Chemical and Physical Properties of Philblack Carbons," Philblack Bulletin No. 12, pp. 1–7, 1948, Phillips Petroleum Co., Akron, Ohio.